United States Patent
Yasui

(10) Patent No.: US 9,598,571 B2
(45) Date of Patent: Mar. 21, 2017

(54) LIGHTWEIGHT TERRAZZO SURFACE COMPOSITION

(75) Inventor: Arnold Yasui, Santa Fe Springs, CA (US)

(73) Assignee: QUAKER CHEMICAL CORPORATION, Conshohocken, PA (US)

( * ) Notice: Subject to any disclaimer, the term of this patent is extended or adjusted under 35 U.S.C. 154(b) by 369 days.

(21) Appl. No.: 13/273,589

(22) Filed: Oct. 14, 2011

(65) Prior Publication Data

US 2012/0094023 A1    Apr. 19, 2012

Related U.S. Application Data

(60) Provisional application No. 61/393,637, filed on Oct. 15, 2010.

(51) Int. Cl.
| | | |
|---|---|---|
| C08L 63/00 | (2006.01) | |
| E04F 15/00 | (2006.01) | |
| C09D 163/00 | (2006.01) | |

(52) U.S. Cl.
CPC ............ *C08L 63/00* (2013.01); *C09D 163/00* (2013.01); *E04F 15/00* (2013.01)

(58) Field of Classification Search
CPC ......... E04F 15/00; C08L 63/00; C09D 163/00
See application file for complete search history.

(56) References Cited

U.S. PATENT DOCUMENTS

| | | | | |
|---|---|---|---|---|
| 6,160,041 A | * | 12/2000 | Neuner | C04B 26/14 523/440 |
| 6,770,328 B1 | | 8/2004 | Whaley | |
| 2002/0016399 A1 | | 2/2002 | Mazur | |
| 2004/0173136 A1 | | 9/2004 | Rivas | |
| 2006/0155004 A1 | * | 7/2006 | Kwak | ..................... 523/117 |
| 2008/0114094 A1 | | 5/2008 | Shah et al. | |
| 2011/0023763 A1 | | 2/2011 | Morgan et al. | |

FOREIGN PATENT DOCUMENTS

DE    19728000    2/1999

OTHER PUBLICATIONS

Kukdo Chemical YD-128 Product Information, http://www.kukdo.com/file/goods/YD-128_TDS_.pdf, Dec. 1, 2004.*
ThreeBond Technical News: Curing Agents for Epoxy Resins, https://www.threebond.co.jp/en/technical/technicalnews/pdf/tech32.pdf, Dec. 20, 1990.*
Baumeister et al. "Characterization and application of hollow-sphere-composite lightweight materials", Proceedings of the Institution of Mechanical Engineers, Part L: Journal of Materials: Design and Applications, 2005, 219(L4), 207-216.*
International Search Report for International Patent Application No. PCT/US2011/056298, dated Feb. 28, 2012, 2 pages.
Written Opinion for International Patent Application No. PCT/US2011/056298, dated Feb. 28, 2012, 7 pages.

* cited by examiner

*Primary Examiner* — Nicole M Buie-Hatcher
(74) *Attorney, Agent, or Firm* — Morgan, Lewis & Bockius LLP

(57) ABSTRACT

A terrazzo composition containing a resin component; a hardener component; and an aggregate component, where the composition has a tensile strength of about 8500 psi to about 8900 psi, a compressive strength of about 2600 psi to about 3000 psi, a Shore D Hardness of about 50 to about 100, and a weight of about 0.60 pounds per square foot at 0.25 inch thickness to about 0.76 pounds per square foot at 0.25 inch thickness.

13 Claims, No Drawings

LIGHTWEIGHT TERRAZZO SURFACE COMPOSITION

RELATED APPLICATIONS

This application claims the benefit of U.S. Provisional Application No. 61/393,637, filed Oct. 15, 2010, and is incorporated herein by reference in its entirety.

BACKGROUND

Terrazzo flooring and coatings have a long and rich history for construction and decorative purposes, dating back hundreds of years. Methods of creating the durable, seamless surfaces involve mixing a binder, such as a resin, with one or more aggregates, such as marble or granite. Once the mixture is cured, it forms a surface layer that is durable and easy to maintain.

The methods and materials used to create a terrazzo surface vary widely. Terrazzo underlayment generally requires an underlayment, sealer, color coat, decorative colored chips, and a top coat.

SUMMARY OF THE INVENTION

According to some embodiments, the present invention relates to a terrazzo composition including a resin component, a hardener component, and an aggregate component. In some embodiments, the composition has a tensile strength of about 8500 psi to about 8900 psi, a compressive strength of about 2600 psi to about 3000 psi, a Shore D Hardness of about 50 to about 100, and a weight of about 0.60 pounds per square foot at 0.25 inch thickness to about 0.76 pounds per square foot at 0.25 inch thickness. In some embodiments, a terrazzo composition has a tensile strength of about 8700 psi. In some embodiments, a terrazzo composition has compressive strength of about 2800 psi. In some embodiments, a terrazzo composition has a Shore D hardness of about 55. In some embodiments, a terrazzo composition has a weight of about 0.68 pounds per foot at 0.25 inch thickness. In certain embodiments, a terrazzo composition meets all requirements of MIL-PRF-3135H Type I Class 2, MIL-PRF-3135H Type II Class 2, or MIL-PRF-3135H Type III Class 2.

In some embodiments, a terrazzo composition includes a volume ratio of resin component to hardener component of about 4:1 to about 1:1. In some embodiments, a terrazzo composition includes a resin component in an amount of about 32 wt % to about 37 wt %, a hardener component in an amount of about 12.4 wt % to about 12.6 wt %, and/or an aggregate component in an amount of about 50 wt % to about 56 wt %.

In some embodiments, a resin component includes an epoxy resin, which may be present in an amount of about 75 wt % to about 100 wt %.

In some embodiments, a hardener component includes a hardener including at least one of a primary amine, a modified primary amine, an aliphatic, a cycloaliphatic, an anhydride, or combinations thereof.

In some embodiments, an aggregate component includes a bead mixture. The bead mixture may include at least one of polymeric beads, glass beads, cork beads, sand beads, or combinations thereof. In some embodiments, the bead mixture includes non-uniformly sized beads and/or colored beads.

In some embodiments, a terrazzo composition is a terrazzo underlayment, or a decorative floor covering.

According to some embodiments, a method of preparing a terrazzo surface includes blending a resin component, a hardener component, and an aggregate component to provide a terrazzo composition; applying the terrazzo composition to a surface; and curing the terrazzo composition to provide a terrazzo surface. In some embodiments, the terrazzo surface has a tensile strength of about 8500 psi to about 8900 psi, a compressive strength of about 2600 psi to about 3000 psi, a Shore D Hardness of about 55 to about 100, and a weight of about 0.60 pounds per square foot at 0.25 inch thickness to about 0.76 pounds per square foot at 0.25 inch thickness.

In some embodiments, a bond coat is applied to a surface prior to applying the terrazzo composition and/or a top coat is applied to the terrazzo surface after curing.

DETAILED DESCRIPTION OF THE INVENTION

Compositions and methods of the present invention relate to a lightweight terrazzo composition. In some embodiments, the terrazzo composition of the present invention may be used as an underlayment for a finished surface. In some embodiments, the terrazzo composition of the present invention may be used to produce decorative finished surface. In some embodiments, the terrazzo composition of the present invention may be prepared with a reduced number of steps compared to known terrazzo compositions.

In some embodiments, the terrazzo composition of the present invention is a three component system. In some embodiments, a terrazzo composition includes (1) a resin component, (2) a hardener component, and (3) an aggregate component.

Resin Component

In some embodiments, a terrazzo composition includes a resin component. In some embodiments, a resin component includes a resin. In some embodiments, suitable resins may include but are not limited to an epoxy resin, such as Bis phenol A, Bis phenol F, Novolac, hydrogenated Bis phenol A or a cycloaliphatic.

In some embodiments, a resin component includes a resin in an amount of about 65 wt % to about 99 wt %; about 70 wt % to about 99 wt %; about 75 wt % to about 99 wt %; about 75 wt % to about 95 wt %; about 80 wt % to about 95 wt %; about 80 wt % to about 90 wt %; about 85 wt % to about 95 wt %; or about 85 wt % to about 90 wt %. In some embodiments, a resin component includes a resin in an amount of about 65 wt %; about 66 wt %; about 67 wt %; about 68 wt %; about 69 wt %; about 70 wt %; about 71 wt %; about 72 wt %; about 73 wt %; about 74 wt %; about 75 wt %; about 76 wt %; about 77 wt %; about 78 wt %; about 79 wt %; about 80 wt %; about 81 wt %; about 82 wt %; about 83 wt %; about 84 wt %; about 85 wt %; about 86 wt %; about 87 wt %; about 88 wt %; about 89 wt %; about 90 wt %; about 91 wt %; about 92 wt %; about 93 wt %; about 94 wt %; about 95 wt %; about 96 wt %; about 97 wt %; about 98 wt %; or about 99 wt %. In some embodiments, a suitable amount of resin in a resin component is determined based on desired physical properties such as viscosity, hardness and tensile strength, etc.

In some embodiments, a resin is diluted. Suitable diluents may be monofunctional or multifunctional. Suitable diluents may include, but are not limited to, aliphatic monoglycidyl ether, butyl glycidyl ether, O-cresyl glycidyl ether, neopentyl glycol diglycidyl ether, and/or trimethylolpropane triglycidyl ether. In some embodiments, a resin component includes diluent in an amount of about 0 wt % to about 35 wt %; about 0 wt % to about 30 wt %; about 0 wt % about 25 wt %; about 0 wt % to about 20 wt %; about 1 wt % to about 35 wt %; about 1 wt % to about 30 wt %; about 1 wt % to about 25 wt %; about 1 wt % to about 24 wt %; about 2 wt % to about 22 wt %; about 3 wt % to about 21 wt %; about 4 wt % to about 20 wt %; about 5 wt % to about 19 wt %; about 6 wt % to about 18 wt %; about 7 wt % to about 17 wt %; about 8 wt % to about 16 wt %; about 9 wt % to about 15 wt %; about 10 wt % to about 14 wt %; about 11 wt % to about 13 wt %. In some embodiments, a resin component includes diluent in amount of 0 wt %; about 1 wt %; about 2 wt %; about 3 wt %; about 4 wt %; about 5 wt %; about 6 wt %; about 7 wt %; about 8 wt %; about 9 wt %; about 10 wt %; about 11 wt %; about 12 wt %; about 13 wt %; about 14 wt %; about 15 wt %; about 16 wt %; about 17 wt %; about 18 wt %; about 19 wt %; about 20 wt %; about 21 wt %; about 22 wt %; about 23 wt %; about 24 wt %; about 25 wt %; about 26 wt %; about 27 wt %; about 28 wt %; about 29 wt %; about 30 wt %; about 31 wt %; about 32 wt %; about 33 wt %; about 34 wt %; or about 35 wt %. In some embodiments, a suitable amount of diluent in a terrazo composition is determined based on desired physical properties such as viscosity, hardness and tensile strength, etc.

In some embodiments, a resin component includes flame retardant, colorant and/or a defoamer. In some embodiments, a resin component includes aliphatic monoglycidal ether and/or cresyl glycidal ether.

In some embodiments, a terrazzo composition includes a resin component in an amount of about 20 wt % to about 50 wt %; about 21 wt % to about 49 wt %; about 22 wt % to about 48 wt %; about 23 wt % to 47 wt %; about 24 wt % to about 46 wt %; 25 wt % to about 45 wt %; about 26 wt % to about 44 wt %; about 27 wt % to about 43 wt %; about 28 wt % to about 42 wt %; about 29 wt % to about 41 wt %; about 30 wt % to about 40 wt %; about 31 wt % to about 39 wt %; about 32 wt % to about 38 wt %; about 32 wt % to about 37 wt %; or about 33 wt % to about 36 wt %. In some embodiments, a terrazzo composition includes a resin component in an amount of about 20 wt %; 21 wt %; 22 wt %; 23 wt %; 24 wt %; 25 wt %; 26 wt %; 27 wt %; 28 wt %; 29 wt %; 30 wt % 31 wt %; 32 wt %; 33 wt %; 34 wt %; 35 wt %; 36 wt %; 37 wt %; 38 wt %; 39 wt %; 40 wt %; 41 wt %; 42 wt %; 43 wt %; 44 wt %; 45 wt %; 46 wt %; 47 wt %; 48 wt %; 49 wt %; and 50 wt %.

Hardener Component

In some embodiments, a terrazzo composition includes a hardener component. In some embodiments, a hardener component includes one or more hardeners. Suitable hardeners may include but are not limited to primary amine, modified primary amine, aliphatic, cycloalphatic, or an anhydride. In some embodiments, a suitable hardener includes a low-viscosity, rapid-cure aliphatic amine such as Ancamine® 2089M. In some embodiments, a hardener component includes a multi-functional polyamine such as polyether triamine, which is commercially available as Jeffamine® T403.

In some embodiments, a suitable hardener or combination of hardeners is selected based on desired gel time. For example, in some embodiments, when a long gel time is desired, a hardener component may include Jeffamine® T403 alone. In some embodiments, when a short gel time is desired, a hardener component may include Ancamine® 2089M alone. In some embodiments, blends of hardeners may be used to control gel time, tackfree time, light traffic usage, etc.

In some embodiments, a terrazzo composition includes a hardener component in an amount of about 10.0 wt % to about 15.0 wt %; about 10.1 wt % to about 14.9 wt %; about 10.2 wt % to about 14.8 wt %; about 10.3 wt % to about 14.7 wt %; about 10.4 wt % to about 14.6 wt %; about 10.5 wt % to about 14.5 wt %; about 10.6 wt % to about 14.4 wt %; about 10.7 wt % to about 14.3 wt %; about 10.8 wt % to about 14.2 wt %; about 10.9 wt % to about 14.1 wt %; about 11.0 wt % to about 14.0 wt %; about 11.1 wt % to about 13.9 wt %; about 11.2 wt % to about 13.8 wt %; about 11.3 wt % to about 13.7 wt %; about 11.4 wt % to about 13.6 wt %; about 11.5 wt % to about 13.5 wt %; about 11.6 wt % to about 13.4 wt %; about 11.7 wt % to about 13.3 wt %; about 11.8 wt % to about 13.2 wt %; about 11.9 wt % to about 13.1 wt %; about 12.0 wt % to about 13.0 wt %; about 12.1 wt % to about 12.9 wt %; about 12.2 wt % to about 12.8 wt %; about 12.3 wt % to about 12.7 wt %; or about 12.4 wt % to about 12.6 wt %. In some embodiments, a terrazzo composition includes a hardener component in an amount of about 10.0 wt %; about 10.1 wt %; about 10.2 wt %; about 10.3 wt %; about 10.4 wt %; about 10.5 wt %; about 10.6 wt %; about 10.7 wt %; about 10.8 wt %; about 10.9 wt %; about 11.0 wt %; about 11.1 wt %; about 11.2 wt %; about 11.3 wt %; about 11.4 wt %; about 11.5 wt %; about 11.6 wt %; about 11.7 wt %; about 11.8 wt %; about 11.9 wt %; about 12.0 wt %; about 12.1 wt %; about 12.2 wt %; about 12.3 wt %; about 12.4 wt %; about 12.5 wt %; about 12.6 wt %; about 12.7 wt %; about 12.8 wt %; about 12.9 wt %; about 13.0 wt %; about 13.1 wt %; about 13.2 wt %; about 13.3 wt %; about 13.4 wt %; about 13.5 wt %; about 13.6 wt %; about 13.7 wt %; about 13.8 wt %; about 13.9 wt %; about 14.0 wt %; about 14.1 wt %; about 14.2 wt %; about 14.3 wt %; about 14.4 wt %; about 14.5 wt %; about 14.6 wt %; about 14.7 wt %; about 14.8 wt %; about 14.9 wt %; or about 15.0 wt %.

Aggregate Component

In some embodiments, a terrazzo composition includes an aggregate component. In some embodiments, an aggregate component includes a bead mixture. The bead mixture may include a glass bead mixture. In some embodiments, the bead mixture may be polymer, glass, ceramic, cork, sand, or the like. In some embodiments, the bead mixture includes foamed beads and/or hollow spheres. In some embodiments, the bead mixture includes microballoons. In some embodiments, the foamed beads are formed from recycled glass. The foamed beads may be colored, and may or may not be uniform in size and/or shape. In some embodiments, the bead mixture includes spherical beads and/or non-spherical beads.

In some embodiments, all or part of suitable beads such as foam beads may be colored with a single color or multiple colors, depending on the desired effect. In some embodiments, the colorant is a water based acrylic. In some embodiments, the colorant contains no volatile organic compounds. In some embodiments, colorant is added to the beads such as foam beads while being tumbled and allowed to dry on the surface of the beads. Single or multiple coats of colorant may be used to obtain the desired color intensity. In some embodiments, coating one or more of the larger particles produces the required visual effect.

Any suitable size bead or particle can be coated using this method. In some embodiments, an aggregate component may have a largest linear dimension, such as a diameter for a spherical bead, of about 0.1 mm to about 10 mm; about 0.1 mm to about 9 mm; about 0.1 mm to about 8 mm; about 0.1 mm to about 7 mm; about 0.1 to about 6 mm; about 0.1 to about 5 mm; about 0.1 to about 4 mm; about 0.1 mm to about 3 mm; about 0.1 to about 2 mm; about 0.1 mm to about 1 mm; about 0.1 to about 0.9 mm; about 0.1 to about 0.8 mm; about 0.1 mm to about 0.7 mm; about 0.1 mm to about 0.6 mm; about 0.1 mm to about 0.5 mm; about 0.1 mm to about 0.4 mm; about 0.1 to about 0.3 mm; about 0.25 mm to about 0.5 mm; about 0.5 mm to about 1.0 mm; about 1 mm to about 2 mm; about 2 mm to about 4 mm; about 4 mm to about 8 mm; about 8 mm to about 10 mm; about 0.1 mm; about 0.25 mm; about 0.5 mm; about 0.75 mm; about 1 mm; about 2 mm; about 3 mm; about 4 mm; about 5 mm; about 6 mm; about 7 mm; about 8 mm; about 9 mm; or about 10 mm.

In some embodiments, a terrazzo composition includes an aggregate component in an amount 40 wt % to about 66 wt %; about 41 wt % to about 65 wt %; about 42 wt % to about 64 wt %; about 43 wt % to about 63 wt %; about 44 wt % to about 62 wt %; about 45 wt % to about 61 wt %; about 46 wt % to about 60 wt %; about 47 wt % to about 59 wt %; about 48 wt % to about 58 wt %; about 49 wt % to about 57 wt %; or about 50 wt % to about 56 wt %. In some embodiments, a terrazzo composition contains an aggregate component in an amount of about 40 wt %; about 41 wt %; about 42 wt %; about 43 wt %; about 44 wt %; about 45 wt %; about 46 wt %; about 47 wt %; about 48 wt %; about 49 wt %; about 50 wt %; about 51 wt %; about 52 wt %; about 53 wt %; about 54 wt %; about 55 wt %; about 56 wt %; about 57 wt %; about 58 wt %; about 59 wt %; about 60 wt %; about 61 wt %; about 62 wt %; about 63 wt %; about 64 wt %; about 65 wt %; or about 66 wt %.

Preparation

As described above, a terrazzo composition may contain a resin component, a hardener component, and an aggregate component. In some embodiments, a terrazzo composition is prepared by preparing a resin component by diluting a resin with a diluent. The diluted resin, or resin component, may then be mixed with a hardener component, such as those and in the amounts described above. In some embodiments, a hardener component may be poured into a resin component and mixed for about 2-3 minutes, for instance, with a mechanical jiffy mixer. In some embodiments, the mixed material is poured into a second clean container and remixed to ensure complete reaction of the resin.

In some embodiments, this mixture is combined with an aggregate component, such as those and in the amounts described above. The aggregate component may be immediately added to the blended resin/hardener components while mixing, for instance, with a mechanical jiffy mixture. Mixing may be continued at high speed for about 2-3 minutes to ensure no dry materials remain. In some embodiments, the blend is transferred to a second clean container to ensure all materials are well-mixed. In some embodiments, the final mix will be a substantially homogenous mix of color and particle size.

The proportions for the ratio of resin to hardener according to MIL-PRF-3135H are limited to 4:1, 3:1, 2:1, or 1:1 by volume. In some embodiments, in order to meet the requirements of MIL-PRF-3135H, the resin component and hardener component are designed to mix at a resin component to hardener component volume ratio of about 2:1. In order for compositions of the present invention to meet the requirements of MIL-PRF-3135H (for example, weight, resistance to impact, indentation, resistance to elevated temperature, resistance to moisture and temperature change, moisture absorption, resistance to chemicals, resistance to corrosion, fire performance, adhesive strength, properties after aging and/or after exposure, etc.), in some embodiments, the resin component is present in an amount of about 32 wt % to about 37 wt %, the hardener component is present in an amount of about 12.4 wt % to about 12.6 wt %, and the aggregate component is present in an amount of about 50.0 wt % to about 56.0 wt %.

In some embodiments, components of a terrazzo composition may be designed to product a terrazzo composition with a desired finished density. In some embodiments, finished density is important to meet the requirements of MIL-PRF-3135H, and to other physical requirements of MIL-PRF-3135H. In some embodiments, a resin component has an initial density of about 0.8 g/cc to about 1.65 g/cc; about 0.8 g/cc; about 0.9 g/cc; about 1.0 g/cc; about 1.1 g/cc; about 1.2 g/cc; about 1.3 g/cc; about 1.4 g/cc; about 1.5 g/cc; or about 1.6 g/cc. In some embodiments, a hardener component has an initial density of about 0.6 g/cc to about 1.4 g/cc; about 0.6 g/cc; about 0.7 g/cc; about 0.8 g/cc; about 0.9 g/cc; about 1.0 g/cc; about 1.1 g/cc; about 1.2 g/cc; about 1.3 g/cc; or about 1.4 g/cc. In some embodiments, an aggregate composition has an initial density of about 0.05 g/cc to about 0.6 g/cc; about 0.05 g/cc; about 0.1 g/cc; about 0.2 g/cc; about 0.3 g/cc; about 0.4 g/cc; about 0.5 g/cc; or about 0.6 g/cc. In an exemplary embodiment, a resin component with an initial density of about 1.15 g/cc, a hardener component with an initial density of about 0.99 g/cc, and an aggregate component with an initial density of about 0.29 g/cc are combined to prepare a terrazzo composition with a finished density of about 0.62 g/cc.

In some embodiments, the prepared terrazzo mixture should be applied immediately following preparation. In some embodiments, a prepared terrazzo mixture has a pot life of about 0.5 hours.

In some embodiments, a curing reaction of the terrazzo composition is mass sensitive, creating heat as it hardens. The thicker the application of the mixture, the faster the terrazzo may harden and become suitable to accept light traffic.

Use

In some embodiments, a terrazzo composition of the present invention is suitable as an underlayment for a finished surface. In some embodiments, a terrazzo composition of the present invention provides a decorative surface. In some embodiments, a terrazzo composition may resemble a marble or granite surface when cured.

In some embodiments, a terrazzo composition of the present invention is suitable for application to decks, ship decks, showers, bathrooms, mess areas, shops, offices, galleys, berthing, passageways, and the like. A terrazzo composition of the present invention may be suitable to fair and level a surface. For example, a terrazzo composition of some embodiments is suitable for use in providing a fair and level surface where irregularities, grades, or contours exist.

In some embodiments, a terrazzo composition may be applied to a prepared surface such as metal. Before application, all visible oil, grease, sludge and any other contaminants should be removed prior to any abrasive surface preparation. In some embodiments, carbon steel may be prepared according to SSPC-SP11.

If desired, a bond coat may be applied to the prepared surface. For example, SynDeck® Bond Coat (SS1222) is a low viscosity, water-clear, 100% solids epoxy specifically designed as a primer material for use in conjunction with installation of underlay material. A bond coat, such as SynDeck®, may provide benefits such as desirable adhesion, convenient 2:1 mix ratio, and chemical resistance.

A terrazzo composition may be applied to the desired surface by any suitable method, including but not limited to troweling. In some embodiments, a hand trowel may be used to spread the resin/aggregate to the desired thickness. A terrazzo composition may be applied at any suitable desired thickness. A terrazzo composition may be applied at a thickness as thin as the largest particle included in the aggregate component of the terrazzo composition. In some embodiments, a terrazzo composition may be applied at a thickness of about 0.25 inch. In some embodiments, a terrazzo composition is applied at a thickness of up to about 0.25 inch; up to about 0.5 inch; up to about 0.75 inch; up to about 1 inch; up to about 1.25 inch; up to about 1.5 inch; up to about 1.75 inch; up to about 2 inches; up to about 2.25 inches; up to about 2.5 inches; up to about 2.75 inches; or up to about 3 inches.

In some embodiments, a grout coat may be applied. One example of a suitable grout coat includes SynDeck® Grout Sealer (SS1255), which is a two component, high thixotropic index epoxy suitable for use to seal decks, floors and other surfaces where higher porosities may be of concern. A grout coat, such as SynDeck® Grout Sealer, may provide benefits such as moisture insensitivity, flexibility which relieves shock and stress, chemical and abrasion resistance, adhesion, mix ratio of 2:1, a fast set up and/or clear color.

In some embodiments, the applied terrazzo composition is cured for a suitable length of time. In some embodiments, the terrazzo composition may be dry for walking traffic in about 3-10 hours. In some embodiments, the terrazzo composition may be fully cured in about 3 days. In some embodiments, a cured terrazzo composition resembles a marble or granite surface.

In some embodiments, a top coat may be applied to a dry cured terrazzo composition. In some embodiments, the terrazzo composition provides a desirable surface without further steps of a color coat and/or decorative chips.

In some embodiments, a terrazzo surface may provide a colored surface. In some embodiments, a terrazzo surface provides a surface of blue, sand, green, salt and pepper, red, or combinations thereof.

In some embodiments, a terrazzo surface has a tensile strength of about 7700 psi to about 9700 psi; about 7800 psi to about 9600 psi; about 7900 psi to about 9500 psi; about 8000 psi to about 9400 psi; about 8100 psi to about 9300 psi; about 8200 psi to about 9200 psi; about 8300 psi to about 9100 psi; about 8400 psi to about 9000 psi; about 8500 psi to about 8900 psi; about 8600 psi to about 8800 psi; about 7700 psi; about 7800 psi; about 7900 psi; about 8000 psi; about 8100 psi; about 8200 psi; about 8300 psi; about 8400 psi; about 8500 psi; about 8600 psi; about 8700 psi; about 8800 psi; about 8900 psi; about 9000 psi; about 9100 psi; about 9200 psi; about 9300 psi; about 9400 psi; about 9500 psi; about 9600 psi; or about 9700 psi.

In some embodiments, a terrazzo surface has a compressive strength of about 1800 psi to about 3800 psi; about 1900 psi to about 3700 psi; about 2000 psi to about 3600 psi; about 2100 psi to about 3500 psi; about 2200 psi to about 3400 psi; about 2300 psi to about 3300 psi; about 2400 psi to about 3200 psi; about 2500 psi to about 3100 psi; about 2600 psi to about 3000 psi; about 2700 psi to about 2900 psi; about 1800 psi; about 1900 psi; about 2000 psi; about 2100 psi; about 2200 psi; about 2300 psi; about 2400 psi; about 2500 psi; about 2600 psi; about 2700 psi; about 2800 psi; about 2900 psi; about 3000 psi; about 3100 psi; about 3200 psi; about 3300 psi; about 3400 psi; about 3500 psi; about 3600 psi; about 3700 psi; or about 3800 psi.

In some embodiments, a terrazzo surface has a Shore D hardness of about 40 to about 110; about 42 to about 108; about 44 to about 106; about 46 to about 104; about 48 to about 102; about 50 to about 100; about 52 to about 100; about 54 to about 100; about 56 to about 100; about 58 to about 100; about 60 to about 100; about 62 to about 100; about 64 to about 100; about 66 to about 100; about 68 to about 108; about 70 to about 106; about 72 to about 104; about 74 to about 102; about 76 to about 100; about 78 to about 98; about 80 to about 96; about 82 to about 94; about 84 to about 92; about 86 to about 90; about 87 to about 89; about 40; about 42; about 44; about 46; about 48; about 50; about 52; about 54; about 56; about 58; about 60; about 62; about 64; about 66; about 68; about 70; about 72; about 74; about 76; about 78; about 80; about 82; about 84; about 86; about 88; about 90; about 92; about 94; about 96; about 98; about 100; about 102; about 104; about 106; or about 108.

The components of a terrazzo composition may be formulated to provide a terrazzo surface with a desired combination of properties. In an exemplary embodiment, a terrazzo surface has a tensile strength of about 8700 psi, a compressive strength of about 2800 psi, and a Shore D hardness of about 55, in accordance with the requirements of MIL-PRF-3135H. To maintain tensile strength of about 8700 psi, the maximum level of diluent in the resin component of the exemplary embodiment is below about 25 wt %. The compressive strength may be controlled by adjusting the ratio of resin component, hardener component, and aggregate component. The exemplary embodiment represents a compromise to meet the MIL-PRF-3135H specification, and to facilitate application and ease of handling. According to the exemplary embodiment, a 10% reduction of resin component/hardener component to aggregate component ratio will reduce the compressive strength of the terrazzo surface to less than 2000 psi, which is below the MIL-PRF-3135H specification. Such a reduction of compressive strength will also cause a reduction of hardness in the exemplary embodiment.

In some embodiments, a terrazzo surface meets MIL-PRF-3135H Type I, II, III, Class 2.

In some embodiments, a terrazzo surface is lightweight. In some embodiments, a terrazzo surface has a weight of about 0.68 pounds per square foot at 0.25 inch thickness. In some embodiments, a terrazzo surface with a thickness of about 0.25 inch has a weight of about 0.28 pounds per square foot to about 1.08 pounds per square foot; about 0.30 pounds per square foot to about 1.06 pounds per square foot; about 0.32 pounds per square foot to about 1.04 pounds per square foot; about 0.34 pounds per square foot to about 1.02 pounds per square foot; about 0.36 pounds per square foot to about 1.00 pounds per square foot; about 0.38 pounds per square foot to about 0.98 pounds per square foot; about 0.40 pounds per square foot to about 0.96 pounds per square foot; about 0.42 pounds per square foot to about 0.94 pounds per square foot; about 0.44 pounds per square foot to about 0.92 pounds per square foot; about 0.46 pounds per square foot to about 0.90 pounds per square foot; about 0.48 pounds per square foot to about 0.88 pounds per square foot; about 0.50 pounds per square foot to about 0.86 pounds per square foot; about 0.52 pounds per square foot to about 0.84 pounds per square foot; about 0.54 pounds per square foot to about 0.82 pounds per square foot; about 0.56 pounds per square foot to about 0.80 pounds per square foot; about 0.58 pounds per square foot to about 0.78 pounds per square foot; about 0.60 pounds per square foot to about 0.76 pounds per square foot; about 0.62 pounds per square foot to about 0.74 pounds per square foot; about 0.64 pounds per square foot to about 0.72 pounds per square foot; about 0.66 pounds per square foot to about 0.70 pounds per square foot; about 0.67 pounds per square foot to about 0.69 pounds per square foot; about 0.28 pounds per square foot; about 0.30 pounds per square foot; about 0.32 pounds per square foot; about 0.34 pounds per square foot; about 0.36 pounds per square foot; about 0.38 pounds per square foot; about 0.40 pounds per square foot; about 0.42 pounds per square foot; about 0.44 pounds per square foot; about 0.46 pounds per square foot; about 0.48 pounds per square foot; about 0.50 pounds per square foot; about 0.52 pounds per square foot; about 0.54 pounds per square foot; about 0.56 pounds per square foot; about 0.58 pounds per square foot; about 0.60 pounds per square foot; about 0.62 pounds per square foot; about 0.64 pounds per square foot; about 0.64 pounds per square foot to about 0.70 pounds per square foot; 0.66 pounds per square foot to about 0.68 pounds per square foot; about 0.69 pounds per square foot; about 0.70 pounds per square foot; about 0.72 pounds per square foot; about 0.74 pounds per square foot; about 0.76 pounds per square foot; about 0.78 pounds per square foot; about 0.80 pounds per square foot; about 0.82 pounds per square foot; about 0.84 pounds per square foot; about 0.86 pounds per square foot; about 0.88 pounds per square foot; about 0.90 pounds per square foot; about 0.92 pounds per square foot; about 0.94 pounds per square foot; about 0.96 pounds per square foot; about 0.98 pounds per square foot; about 1.00 pounds per square foot; about 1.02 pounds per square foot; about 1.04 pounds per square foot; about 1.06 pounds per square foot; or about 1.08 pounds per square foot.

In some embodiments, a terrazzo surface has desirable adhesion. In some embodiments, a terrazzo surface has an adhesive strength of about 150 psi minimum and therefore meets the requirements of MIL-PRF-3135H. In some embodiments, a terrazzo surface has an adhesive strength of about 120 psi to about 180 psi; about 122 psi to about 178 psi; about 124 psi to about 176 psi; about 126 psi to about 174 psi; about 128 psi to about 172 psi; about 130 psi to about 170 psi; about 132 psi to about 168 psi; about 134 psi to about 166 psi; about 136 psi to about 164 psi; about 138 psi to about 162 psi; about 140 psi to about 160 psi; about 142 psi to about 158 psi; about 144 psi to about 156 psi; about 146 psi to about 154 psi; about 148 psi to about 152 psi; about 120 psi; about 122 psi; about 124 psi; about 126 psi; about 128 psi; about 130 psi; about 132 psi; about 134 psi; about 136 psi; about 138 psi; about 140 psi; about 142 psi; about 144 psi; about 146 psi; about 148 psi; about 150 psi; about 152 psi; about 154 psi; about 156 psi; about 158 psi; about 160 psi; about 162 psi; about 164 psi; about 166 psi; about 168 psi; about 170 psi; about 172 psi; about 174 psi; about 176 psi; about 178 psi; or about 180 psi.

As used throughout, the term "about" is understood to mean ±10% of the value referenced. For example, "about 100" is understood to literally mean 90 to 110.

EXAMPLES

Example 1

A terrazzo composition was prepared according to the following formula:

|  | Weight | Description | % |
|---|---|---|---|
| Part A - Resin Component | 5.52 lbs. | Resin (Epon ® 828) | 75.6450 |
|  |  | Flame Retardant (AC2-BG) | 15.0000 |
|  |  | Diluent - Aliphatic monoglycidal ether (GE-8) | 7.2250 |
|  |  | Diluent - Cresyl glycidal ether (GE-10) | 2.1250 |
|  |  | Defoamer (PC 1344) | 0.0050 |
|  |  |  | 100.0000 |
| Part B - Hardener Component | 1.9 lbs. | Aliphatic amine (Ancamine ® 2089M) | 60.0000 |
|  |  | Trifunctional primary amine (Jeffamine ® T403) | 40.0000 |
|  |  |  | 100.0000 |
| Part C - Aggregate Component | 8.0 lbs. | Inert hollow ceramic spheres (Cenospheres, CenoStar LS300) | 26.6880 |
|  |  | Glass spheres (Colored Siscor Spheres 0.5-1) | 29.3740 |
|  |  | Glass spheres (Siscor Spheres 1-2) | 43.9380 |
|  |  |  | 100.0000 |

| Colored Bead Formula | |
|---|---|
| Siscor Spheres 0.5-1 | 99.7800 |
| Color Mix | 0.2200 |
|  | 100.0000 |

| Color Mix Formula | |
|---|---|
| Clariant Hostafine ® Colors | 16.0000 |
| Joncryl ® 1915 | 4.0000 |
| Water | 80.0000 |
|  | 100.0000 |

Example 2

Effect of Different Aggregates on Properties

Terrazzo compositions were prepared according to the following formulations. The eight formulations were prepared with an aggregate component, a resin component, and a hardener component in the amounts described below. The aggregate component for each of the eight formulations contained a different combination of aggregate materials, also as described in the table below.

| Materials | Formulations (lbs) | | | | | | | |
|---|---|---|---|---|---|---|---|---|
| | 1 | 2 | 3 | 4 | 5 | 6 | 7 | 8 |
| Aggregates | | | | | | | | |
| Bulk/Special Sand | 17.20 | 17.20 | | | | | | |
| #12 Sand | | | 12.22 | 12.22 | 12.22 | 12.22 | 12.22 | 12.22 |
| Perlite - Special Blend | 1.50 | 1.50 | 1.20 | 1.20 | | | | |
| Extendospheres SLG | | | | | | | | |
| Extendospheres | 4.00 | 4.00 | 3.20 | 3.20 | 3.20 | | | |
| Onyx Classica 3000 | 1.30 | | 1.30 | | | | | |
| Almatis C31C | | 1.30 | | 1.30 | 1.30 | 1.30 | 1.30 | 1.30 |
| Siscor Spheres | | | | | | | | |
| 0.05-.125 | | | | | | 3.20 | | |
| 0.25-0.5 | | | | | | | 3.20 | |
| 0.5-1 | | | | | | | | 3.20 |
| 1-2 | | | | | 1.20 | 1.20 | 1.20 | 1.20 |
| Components | | | | | | | | |
| Aggregate component | 24.00 | 24.00 | 17.92 | 17.92 | 17.92 | 17.92 | 17.92 | 17.92 |
| Resin component (Epoxy resin) | 4.70 | 4.70 | 4.70 | 4.70 | 3.525 | 3.525 | 4.70 | 4.70 |
| Hardener component (clear epoxy hardener) | 1.90 | 1.90 | 1.90 | 1.90 | 1.425 | 1.425 | 1.90 | 1.90 |
| Total weight | 30.60 | 30.60 | 24.52 | 24.52 | 22.87 | 22.87 | 24.52 | 24.52 |
| Properties | | | | | | | | |
| Density | 1.375 | 1.402 | 1.468 | 1.372 | 1.353 | 1.78528 | 1.348 | 1.0835 |
| Compressive Strength, psi | 3340 | 3210 | 6460 | 5640 | 4810 | 2940 | 5030 | 1350 |

The density and compressive strength were measured for each formulation, demonstrating the effect of the different aggregate combinations on these properties.

Example 3

Effect of Aggregates and Aggregate Sizes on Product Properties

Terrazzo compositions were prepared according to the following formulations. The thirteen formulations were prepared with an aggregate component, a resin component, and a hardener component in the amounts described below. The aggregate component for each of the thirteen formulations contained a different combination of aggregate materials, also as described in the table below.

| Materials | Formulations (lbs) | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Aggregates | | | | | | | | | | | | | |
| Bulk/Special Sand | 17.200 | | | | | | | | | | | | |
| #12 Sand | | 12.220 | 12.220 | 12.220 | 12.220 | 12.220 | 12.220 | 9.450 | 9.450 | 9.450 | 6.330 | | |
| Perlite Special Blend | 1.500 | 1.200 | | | | | | | | | | | |
| Extendospheres SLG | 4.000 | 3.200 | | | 1.000 | 2.000 | 3.000 | 2.320 | 2.320 | 2.320 | 1.550 | | |
| Almatis C31C | 1.300 | 1.300 | 1.300 | 1.300 | 1.300 | 1.300 | 1.300 | 1.000 | 1.000 | 1.000 | 1.000 | 1.000 | |
| Siscor | | | | | | | | | | | | | |
| 0.05-.125 | | | | | | | | | | | | 2.320 | |
| 0.25-0.5 | | | 3.200 | | | | | | | | | | |
| 0.5-1 | | | | 3.200 | 3.200 | 3.200 | 3.200 | 2.320 | 2.320 | 2.320 | 1.550 | 2.320 | 2.500 |
| 1-2 | | | 1.200 | 1.200 | 1.200 | 1.200 | 1.200 | 0.930 | 0.930 | 0.930 | 0.620 | 1.930 | 5.000 |
| 2-4 | | | | | | | | | 1.000 | 1.900 | 1.270 | 1.900 | 2.500 |

-continued

| | Formulations (lbs) | | | | | | | | | | | | |
|---|---|---|---|---|---|---|---|---|---|---|---|---|---|
| Materials | 1 | 2 | 3 | 4 | 5 | 6 | 7 | 8 | 9 | 10 | 11 | 12 | 13 |
| Components | | | | | | | | | | | | | |
| Aggregate component | 24.000 | 17.920 | 17.920 | 17.920 | 18.920 | 19.920 | 20.920 | 16.020 | 16.020 | 16.020 | 11.050 | 7.570 | 7.500 |
| Resin component (Epoxy resin w/ flameout) | 4.700 | 4.700 | 4.700 | 4.700 | 4.700 | 4.700 | 4.700 | 4.700 | 4.700 | 4.700 | 4.700 | 4.700 | 4.700 |
| Hardener component (Clear epoxy hardener) | 1.900 | 1.900 | 1.900 | 1.900 | 1.900 | 1.900 | 1.900 | 1.900 | 1.900 | 1.900 | 1.900 | 1.900 | 1.900 |
| Total weight | 30.600 | 24.520 | 24.520 | 24.520 | 25.520 | 26.520 | 27.520 | 22.620 | 22.620 | 22.620 | 17.650 | 14.170 | 14.100 |
| Properties | | | | | | | | | | | | | |
| Specific Gravity | 1.33 | 1.46 | 1.23 | 1.08 | 1.13 | 0.95 | 1.05 | 1.07 | 0.96 | 0.83 | 0.93 | 0.55 | |
| Compressive Strength, psi | 4640 | 5660 | 1730 | 730 | 1220 | 1590 | 2170 | 2900 | 2190 | 1600 | 1920 | 950 | 250 |

The specific gravity and compressive strength were measured for each formulation, demonstrating the effect of the different aggregate combinations and aggregate sizes on these properties.

Example 4

Effect of Mixing and Aggregate to Resin Mix Ratio

Terrazzo formulations were prepared according to the mixing procedures or the aggregate to resin mix ratios described in the table below. For each of the tested conditions, the listed properties were measured, and demonstrate the effect of the mixing procedures and aggregate to resin mix ratio on the products.

| | Properties | | | | |
|---|---|---|---|---|---|
| Sample (Test condition) | Compressive strength, psi Average | Compressive Yield, psi with coating | Compressive Modulus psi | Impact Resistance 2 lb. Ball (1-10) | Moisture Absorption % 24 hours |
| #1 Standard Mix by Hand Only | 2,080 | 4,097 | 228,765 | 5 | 0.47 |
| #2 Standard Mix Mixer | 2,400 | 4,158 | 66,334 | 5 | 0.11 |
| #3 11% Resin Held Out | 1,217 | 2,813 | 289,233 | 5 | −0.18 |
| #4 25% Resin Held Out | 1,196 | 3,426 | 212,056 | 5 | 0.17 |
| #5 50% Resin Held Out | 631 | 3,945 | 270,200 | 5 | 4.00 |
| #6 75% Resin Held Out | 461 | 2,067 | 166,025 | 5 | 3.85 |

Example 5

Effect of Aggregate Mix on Properties

Terrazzo compositions were prepared according to the following formulations. The four formulations were prepared with an aggregate component, a resin component, and a hardener component in the amounts described below. The aggregate component for each of the four formulations contained a different combination of aggregate materials, also as described in the table below.

| | Formulations (lbs) | | | |
|---|---|---|---|---|
| Materials | 1 | 2 | 3 | 4 |
| Aggregates | | | | |
| #12 Sand | 9.450 | 9.450 | 6.330 | 5.450 |
| Extendospheres SLG | 2.320 | 2.320 | 1.550 | 1.330 |
| Almatis C31C | 1.000 | 1.000 | 1.000 | 0.860 |
| Siscopr | | | | |
| 0.5-1 | 2.320 | 2.320 | 1.550 | 1.330 |
| 1-2 | 0.930 | 0.930 | 0.620 | 0.530 |
| 2-4 | 1.000 | 0.750 | 1.270 | 1.090 |
| Components | | | | |
| Aggregate component | 17.020 | 16.770 | 12.320 | 10.590 |
| Resin component (Epoxy resin w/flameout) | 4.700 | 4.700 | 4.700 | 4.700 |
| Hardener component (Clear epoxy hardener) | 1.900 | 1.900 | 1.900 | 1.900 |
| Properties | | | | |
| Specific Gravity | 0.935 | 1.054 | 0.939 | 0.891 |
| Compressive Strength, psi | 2360 | 2080 | 2070 | 2270 |
| Length | 1.008 | 1.008 | 1.008 | 1.008 |
| Length at failure | 1.006 | 1.004 | 1.005 | 1.002 |
| % Compression | 0.1984 | 0.3968 | 0.2976 | 0.5952 |

The specific gravity, compressive strength, length, length at failure, and % compression were measured for each formulation, demonstrating the effect of the different aggregate combinations on these properties.

Example 6

Effect of Different Aggregates on Properties

Terrazzo compositions were prepared according to the following formulations. The seven formulations were prepared with an aggregate component, a resin component, and a hardener component in the amounts described below. The aggregate component for each of the seven formulations contained a different combination of aggregate materials, also as described in the table below.

|  | Formulations (lbs) | | | | | | |
|---|---|---|---|---|---|---|---|
| Materials | 1 | 2 | 3 | 4 | 5 | 6 | 7 |
| Aggregates | | | | | | | |
| Extendospheres SLG Grade FS-150 | 2.320 | 2.320 | 2.320 | | | | |
| Silbrico 35-34 | | | | 2.320 | 0.500 | 0.750 | 1.000 |
| AC-2BG | 1.000 | 0.500 | 0.500 | 0.500 | 0.500 | 0.500 | 0.500 |
| Siscor | | | | | | | |
| 0.5-1 | 2.320 | 2.320 | 2.320 | 2.320 | 2.320 | 2.320 | 2.320 |
| 1-2 | 1.930 | 1.930 | 1.930 | 1.930 | 1.930 | 1.930 | 1.930 |
| Components | | | | | | | |
| Aggregate component | 7.570 | 7.070 | 7.070 | 7.070 | 5.250 | 5.500 | 5.750 |
| Resin component (Epoxy resin w/flameout) | 4.700 | 4.700 | 4.700 | 4.700 | 4.700 | 4.700 | 4.700 |
| Hardener component (Clear epoxy hardener) | 1.900 | 1.900 | 1.900 | 1.900 | 1.900 | 1.900 | 1.900 |
|  | 14.170 | 13.670 | 13.670 | 13.670 | 11.850 | 12.100 | 12.350 |
| Properties | | | | | | | |
| Specific Gravity | 0.899 | 0.910 | 0.875 | 0.894 | 0.837 | 0.854 | 0.833 |
| Compressive Strength | 2860 | 2660 | 2580 | 2870 | 2270 | 1920 | 2180 |

The specific gravity and compressive strength were measured for each formulation, demonstrating the effect of the different aggregate combinations on these properties.

I claim:

1. A cured terrazzo composition, formed from an uncured composition comprising:
   a resin component, including a resin and optionally including a diluent, a flame retardant, a colorant and/or a defoamer, present in an amount of about 30 wt % to about 40 wt % of the uncured composition;
   a hardener component; and
   an aggregate component comprising foamed glass beads and/or hollow ceramic spheres;
   wherein a volume ratio of resin component to hardener component comprises about 4:1 to about 1:1; and
   wherein the cured terrazzo composition has a tensile strength of about 8500 psi to about 8900 psi, a compressive strength of about 2600 psi to about 3000 psi, a Shore D Hardness of about 50 to about 100, and a weight of about 0.60 pounds per square foot at 0.25 inch thickness to about 0.76 pounds per square foot at 0.25 inch thickness.

2. The cured composition of claim 1, wherein the composition meets all requirements of MIL-PRF-3135H Type II Class 2.

3. The cured composition of claim 1, wherein the composition meets all requirements of MIL-PRF-3135H Type III Class 2.

4. The cured composition of claim 1, wherein the resin component is present in an amount of about 32 wt % to about 37 wt % of the uncured composition.

5. The cured composition of claim 1, wherein the hardener component is present in an amount of about 12.4 wt % to about 12.6 wt % of the uncured composition.

6. The cured composition of claim 1, wherein the aggregate component is present in an amount of about 50 wt % to about 56 wt % of the uncured composition.

7. The cured composition of claim 1, wherein the resin component comprises an epoxy resin.

8. The cured composition of claim 1, wherein the resin component comprises an epoxy resin in an amount of about 75 wt % to about 100 wt %.

9. The cured composition of claim 1, wherein the hardener component comprises a hardener comprising at least one of a primary amine, a modified primary amine, an aliphatic, a cycloaliphatic, an anhydride, or combinations thereof.

10. The cured composition of claim 1, wherein the aggregate component comprises a bead mixture.

11. The cured composition of claim 10, wherein the bead mixture comprises non-uniformly sized beads.

12. The cured composition of claim 10, wherein the bead mixture comprises colored beads.

13. The cured composition of claim 1, wherein the cured composition comprises a terrazzo underlayment.

* * * * *